United States Patent
Wuidart et al.

(10) Patent No.: US 6,356,198 B1
(45) Date of Patent: Mar. 12, 2002

(54) CAPACITIVE MODULATION IN AN ELECTROMAGNETIC TRANSPONDER

(75) Inventors: Luc Wuidart, Pourrieres; Michel Bardouillet, Rousset, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/467,603

(22) Filed: Dec. 20, 1999

(30) Foreign Application Priority Data

Dec. 21, 1998 (FR) .............................. 98-16383

(51) Int. Cl.⁷ ............................................... B08B 13/14
(52) U.S. Cl. ............................. 340/572.5; 340/572.1; 340/10.3; 340/10.4; 235/451; 235/492; 235/384; 342/44; 342/51
(58) Field of Search .................... 340/572.5, 572.1, 340/10.4, 10.3, 10.1, 10.2; 235/451, 492, 384, 380; 343/895, 742, 741, 867, 866; 342/44, 51, 27; 375/258; 455/41

(56) References Cited

U.S. PATENT DOCUMENTS

| | | | |
|---|---|---|---|
| 4,075,632 A | * 2/1978 | Baldwin et al. | 342/51 |
| 4,580,041 A | * 4/1986 | Walton | 235/380 |
| 5,021,767 A | * 6/1991 | Fockens et al. | 340/10.34 |
| 5,099,228 A | * 3/1992 | Israel et al. | 340/539 |
| 5,103,222 A | * 4/1992 | Hogen Esch et al. | 340/10.1 |
| 5,214,409 A | * 5/1993 | Beigel | 340/572.1 |
| 5,287,112 A | 2/1994 | Schuermann | 342/42 |
| 5,347,280 A | * 9/1994 | Schuermann | 342/42 |
| 5,446,447 A | * 8/1995 | Carney et al. | 340/572.4 |
| 5,521,590 A | * 5/1996 | Hanaoka et al. | 340/10.51 |
| 5,625,341 A | * 4/1997 | Giles et al. | 340/10.34 |
| 5,701,121 A | * 12/1997 | Murdoch | 340/10.34 |
| 5,808,550 A | * 9/1998 | Raimbault et al. | 340/10.34 |
| 5,883,582 A | * 3/1999 | Bowers et al. | 340/10.2 |
| 6,037,870 A | * 3/2000 | Alessandro | 340/572.1 |
| 6,054,625 A | * 4/2000 | Proctor et al. | 340/572.7 |
| 6,064,298 A | * 5/2000 | Zimmer | 340/426 |
| 6,070,803 A | * 6/2000 | Stobbe | 235/492 |
| 6,072,383 A | * 6/2000 | Gallagher et al. | 340/10.2 |
| 6,167,094 A | * 12/2000 | Reiner | 375/258 |
| 6,208,235 B1 | * 3/2001 | Trontelj | 340/10.1 |

FOREIGN PATENT DOCUMENTS

WO  WO 98/11504  3/1998

* cited by examiner

Primary Examiner—Benjamin C. Lee
(74) Attorney, Agent, or Firm—Lisa K. Jorgenson; Stephen Bongini; Fleit, Kain, Gibbons, Gutman & Bongini P.L.

(57) ABSTRACT

An electromagnetic transponder is provided that includes an oscillating circuit, an electronic circuit, a rectifying circuit, and a capacitive modulation circuit. The oscillating circuit includes an inductive element and the electronic circuit includes a transmission circuit for transmitting digitally-coded information. The rectifying circuit is coupled to the oscillating circuit to provide a DC supply voltage to the electronic circuit, and the capacitive modulation circuit is coupled to both end terminals of the inductive element and to the reference potential of the electronic circuit. In a preferred embodiment, the capacitive modulation circuit includes two capacitors, with capacitor being coupled between one end terminal of the inductive element and the reference potential and the other capacitor being coupled between the other end terminal of the inductive element and the reference potential. Also provided is a system of electromagnetic transmission that includes at least one transponder and a terminal that generates an electromagnetic field for communicating with the transponder when the transponder is in the electromagnetic field.

18 Claims, 3 Drawing Sheets

CAPACITIVE MODULATION IN AN ELECTROMAGNETIC TRANSPONDER

CROSS-REFERENCE TO RELATED APPLICATIONS

This application is based upon and claims priority from prior French Patent Application No. 98-16383, filed Dec. 21, 1998, the entire disclosure of which is herein incorporated by reference.

BACKGROUND OF THE INVENTION

1. Field of the Invention

The present invention relates to electronic circuits, and more specifically to electromagnetic transponders that are interrogated contactless and wireless by a read/write terminal.

2. Description of Related Art

Conventional electromagnetic transponders are transceivers that typically lack an independent power supply, and instead extract the power required by the electronic circuits included therein from a high frequency field radiated by the antenna of the read/write unit. Such electromagnetic transponders are based on the use of oscillating circuits, on the transponder side and on the read/write unit side. These circuits are coupled by a close magnetic field when the transponder enters the field of the read/write unit. The range of a transponder system, that is, the maximum distance from the terminal at which a transponder is activated (awake) depends, especially, on the size of the transponder antenna, on the excitation frequency of the coil of the oscillating circuit generating the magnetic field, and on the intensity of this excitation.

FIG. 1 schematically shows a conventional data exchange system between a read/write unit 1 and a transponder 10. Generally, unit 1 is formed of an oscillating circuit formed of an inductance L1 in series with a capacitor C1 between an output terminal 2 of an antenna coupler 3 and a terminal 4 at a reference potential (generally, ground). Coupler 3 receives a signal f1, provided by an oscillator 5, that forms a high frequency carrier. Signal f1 is used in the absence of a data transmission from terminal 1 to transponder 10, as an "energy source" for activating transponder 10 if the transponder enters the field. If necessary, a modulator 6 provides a data signal based on data, received from an input e that is the output of an electronic system (not shown).

The junction point of capacitor C1 and inductance L1 forms, in the example shown in FIG. 1, a terminal rx for sampling a data signal, received from a transponder 10 and intended for a demodulator 7. An output s of the demodulator communicates the data received from transponder 10 to the electronic system of the read/write unit. Demodulator 7 receives, from oscillator 5, a signal f2 (most often, with the same frequency as signal f1) to enable the demodulation. The demodulation may be performed from a signal sampled across antenna coupler 3 and not across inductance L1. By the excitation from signal f1 inductance L1 of unit 1 generates a high frequency field of small intensity. On the side of transponder 10, an inductance L2, in parallel with a capacitor C2, forms a parallel oscillating circuit (called a reception resonant circuit) for capturing the field generated by the oscillating circuit of unit 1. The resonant circuit (L2-C2) of transponder 10 is tuned on the frequency of the oscillating circuit (L1-C1) of unit 1.

Terminals 11 and 12 of the resonant circuit (corresponding to the terminals of capacitor C2) are connected to two AC input terminals of a rectifying bridge 13 that is formed, for example, of four diodes D1, D2, D3, and D4. In the circuit of FIG. 1, the anode of diode D1 and the cathode of diode D3 are connected to terminal 11. The anode of diode D2 and the cathode of diode D4 are connected to terminal 12. The cathodes of diodes D1 and D2 form a positive rectified output terminal 14. The anodes of diodes D3 and D4 form a reference terminal 15 of the rectified voltage. A capacitor Ca is connected in parallel with rectified output terminals 14 and 15 of bridge 13 to filter the rectified voltage provided by the bridge.

When transponder 10 is in the field of unit 1, a high frequency voltage is generated across the resonant circuit. This voltage, rectified by bridge 13 and smoothed by capacitor Ca, provides a supply voltage Va to electronic circuits of the transponder via a voltage regulator 16. The electronic circuits of the transponder have been symbolized in FIG. 1 by a block 17. This block P generally is a chip (most often integrating regulator 16) containing at least one memory and one processor. To transmit data from transponder 10 to unit 1, block 17 controls a stage of modulation (back modulation) of the resonant circuit (L2-C2).

This modulation stage is generally formed of an electronic switch (a transistor 18) and a resistor R, associated in series between terminals 14 and 15. Transistor 18 is controlled at a much smaller frequency (generally by a factor of at least 10) than frequency f1 of the excitation signal of the oscillating circuit of unit 1. The oscillating circuit of the transponder is thus submitted to an additional damping as compared to the load formed of regulator 16 and circuit 17 when switch 18 is closed. The voltage decreases across winding L2 so that the transponder takes a greater amount of energy from the high frequency field.

In the system range, two effects of the presence of the transponder in the field can be made out. At a relatively large distance (that is, substantially at the range limit), the oscillating circuit of the terminal operates with no interference. At a smaller distance, there is an increase in the charge of the oscillating circuit of unit 1. Accordingly, the amplitude across inductance L1 decreases. Thus, there is a transfer of the amplitude modulation performed by transponder 10 to read/write unit 1. which can then detect the presence of transponder 10 in its field. Another method consists of detecting the phase variation due to this change of charge on the oscillating circuit of unit 1.

Different types of modulation may be used for the data exchanges between unit 1 and transponder 10. Most often, an amplitude modulation representing either the entirety of signal f1 (all or nothing modulation), or a small portion (on the order of 10%) of this amplitude is used, according to the supply need of transponder 10. It should be noted that, whatever the type of modulation used (for example, phase or frequency modulation) and whatever the type of data coding (NRZ, NRZI, or Manchester), the transmission of the modulation is performed digitally, by skip between two binary levels.

The matching frequency of the oscillating circuits conditions the transmission rate since the frequency of modulation, by switch 18 on the transponder side must be clearly smaller than the carrier frequency used to supply the transponders. Accordingly, the higher the supply carrier frequency, the greater the data flow rate can be. For example, conforming to a standard ISO 14443 of small distance transponder systems (distance smaller than twenty centimeters), the frequency of carrier f1 is 13.56 MHZ and the frequency of the control pulses of switch 18, on the transponder side, is 847 kHz (16 times less).

Conventional transponder systems such as those described hereabove suffer from several drawbacks. A first drawback is that "transmission gaps", that is, distances between the transponder and the terminal at which the terminal does not detect the transponder even though the transponder is in its field, can occur. Such transmission gaps occur when the transponder is very close to the read/write unit, that is, when the distance between both inductive coupling elements L1 and L2 is small as compared to the system operating range. For example, for an application to small distance systems under a 13.56 MHZ frequency, the range is on the order of 10 centimeters and detection losses appear when the transponder is at less than three centimeters from the read/write unit. A conventional solution for overcoming this problem is to force a minimum interval between the transponder and unit 1. However, a disadvantage of such a solution is that is reduces the system range by this interval.

Another drawback of conventional transponder systems is that the use of a resistor R in the modulation stage of transponder 10 causes a dissipation upon modulation by the transponder. Because the transponder is not independently supplied but takes its power supply from the high frequency field coming from the read/write system, power consumption must be minimized.

SUMMARY OF THE INVENTION

In view of these drawbacks, it is an object of the present invention to overcome the above-mentioned drawbacks and to provide a transponder that avoids transmission gaps while maintaining the maximum system range. On the transponder side, a modulation element acts upon the resonance frequency of the oscillating circuit and not upon its amplitude, as in the case of a resistor. Thus, there is a slight detuning of the oscillating circuits in a modulation (back modulation) by the transponder.

Another object of the present invention is to provide a transponder that is simple and inexpensive with respect to the components used, to help the transponder miniaturization.

Yet another object of the present invention is to reduce the power consumption of a transponder.

Still another object of the present invention is to provide simple circuitry to enable modification of the equivalent capacitance of the oscillating circuit. For example, simple MOS transistors can be provided to enable the control of a capacitive modulation circuit of a transponder oscillating circuit.

One embodiment of the present invention provides an electromagnetic transponder that includes an oscillating circuit, an electronic circuit, a rectifying circuit, and a capacitive modulation circuit. The oscillating circuit includes an inductive element and the electronic circuit includes a transmission circuit for transmitting digitally-coded information. The rectifying circuit is coupled to the oscillating circuit to provide a DC supply voltage to the electronic circuit, and the capacitive modulation circuit is coupled to both end terminals of the inductive element and to the reference potential of the electronic circuit. In a preferred embodiment, the capacitive modulation circuit includes two capacitors, with capacitor being coupled between one end terminal of the inductive element and the reference potential and the other capacitor being coupled between the other end terminal of the inductive element and the reference potential.

Another embodiment of the present invention provides a system of electromagnetic transmission that includes at least one transponder and a terminal that generates an electromagnetic field for communicating with the transponder when the transponder is in the electromagnetic field. The transponder includes an oscillating circuit, an electronic circuit, a rectifying circuit. and a capacitive modulation circuit. The oscillating circuit includes an inductive element and the electronic circuit transmits digitally-coded information to the terminal. The rectifying circuit is coupled to the oscillating circuit to provide a DC supply voltage to the electronic circuit, and the capacitive modulation circuit is coupled to both end terminals of the inductive element and to the reference potential of the electronic circuit. In one preferred embodiment, the transponder also includes a resistive modulation circuit coupled in parallel with a capacitor to filter the DC supply voltaage provided by the rectifying circuit.

Other objects, features, and advantages of the present invention will become apparent from the following detailed description. It should be understood, however, that the detailed description and specific examples, while indicating preferred embodiments of the present invention, arc given by way of illustration only and various modifications may naturally be performed without deviating from the present invention.

DETAILED DESCRIPTION OF PREFERRED EMBODIMENTS

Figure 1:
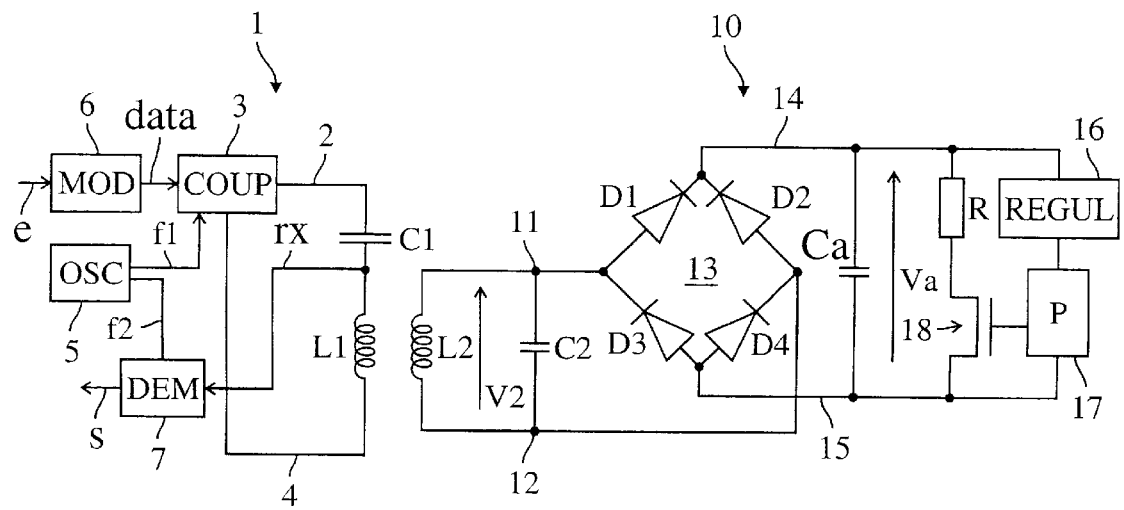
FIG. 1 shows a conventional electromagnetic transmission circuit.

Preferred embodiments of the present invention will be described in detail hereinbelow with reference to the attached drawings. The same elements are referred to with the same reference numerals in the different drawings. For clarity, only those elements necessary to the understanding of the present invention are shown in the drawings and described hereafter. In particular, the structures of the control and modulated signal processing circuits are not described in detail.

Figure 2:
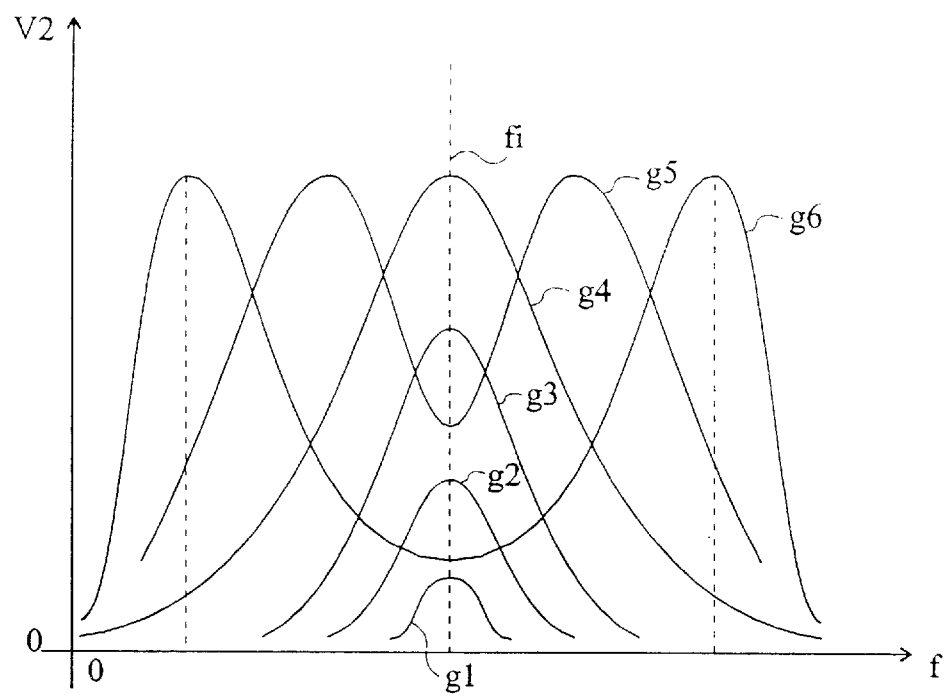
FIG. 2 illustrates the effects of the distance between two tuned oscillating circuits upon the voltage recovered according to the magnetic coupling.

The present invention is based on a novel analysis of the causes of transmission losses in electromagnetic transponder systems. FIG. 2 shows, for several spacings between a transponder and a read/write unit, examples of voltage-frequency characteristics, where the voltage represents the remote supply voltage of the transponder (for example, voltage V2 across inductance L2 of the transponder) and where f corresponds to the excitation frequency of the oscillating circuit of the terminal. The different curves illustrated in FIG. 2 are plotted for oscillating circuits tuned on position fi, that is, the resonance frequency of circuits L1-C1 and L2-C2. Curves g1, g2, g3, g4, g5, and g6 indicate decreasing distances between the transponder and the read/write system.

In other words, curve g1, which represents a small dome centered on tuning frequency fi, substantially corresponds to the system range limit. This is called a loose coupling. As the distance reduces, the peak of the dome formed by the voltage-frequency characteristic increases, as shown by curves g2, g3, and g4. Curve g4 illustrates the optimal coupling frequency, that is, the distance at which the coupling is optimized by a maximum remote supply amplitude received by the transponder at frequency fi. After this distance, if the transponder is brought still closer to unit 1, the voltage amplitude appears to decrease (curve g5) more and more (curve g6) as a "contact" between inductances L1 and L2 becomes closer.

It should be noted that the occurrence of remote supply gaps found in conventional systems appears from curves g5 and g6, which correspond to the most reduced distances between the transponder and the read/write system. As illustrated in FIG. 2, when voltage V2 starts decreasing at tuning frequency fi, the shape of the voltage according to the frequency shows, for these distances, two peaks on either side of the tuning frequency linked to each other by a minimum (gap) at the tuning frequency. Further, it is also shown that, as the distance decreases, the peaks move away from each other and the minimum comes close to a zero voltage.

If systems can sometimes be adapted so that the transponder is always supplied, that is, so that the small amplitude is sufficient for the operation of the transponder circuits, this is no longer true in case of a resistive modulation. Indeed, this modulation results in generating a voltage drop which, if combined with the small voltage associated with the presence of a remote supply gap, makes the fixed terminal incapable of distinguishing binary state switching of the transponder modulation caused by a closing of switch 18 from a coupling loss due to a loss of the field by the transponder. Further, since the remote supply is then very small, the resistive dissipation is highly prejudicial to the maintaining of a correct operation of the transponder.

Based on this analysis, the present invention uses a modulation acting upon the resonance frequency of the oscillating circuit by modifying the equivalent capacitance of the oscillating circuit on the transponder side. It should be noted that, in the absence of a back modulation by the transponder, the oscillating circuits preferably remain tuned, that is, with the same resonance frequency. Thus, only when data needs to be transmitted from the transponder to the base is the resonance frequency of the oscillating circuit slightly shifted to exit the possible gap area according to the distance separating the transponder from the terminal, to thus enable the data transmission from the transponder to the terminal. It should also be noted that the transponder is necessarily sensed by the terminal since, in such an electronic circuit, the transponder necessarily starts by an approach from the remote range distance to a smaller distance.

The capacitive modulation does not disturb the resonance as concerns its amplitude provided that the small value of the capacitance, added to the capacitance of the resonant circuit, maintains the coupling in an area close to the tuning. Accordingly, since there is no additional resistive voltage drop, the remote supply is maintained. The capacitive modulation directly influences the phase of the voltage across inductance L1 of the terminal since, by coupling, this modulation is brought back on this inductance and introduces a variation essentially on the imaginary part of the complex impedance of circuit L1-C1, and thus directly on the phase.

Figure 3:
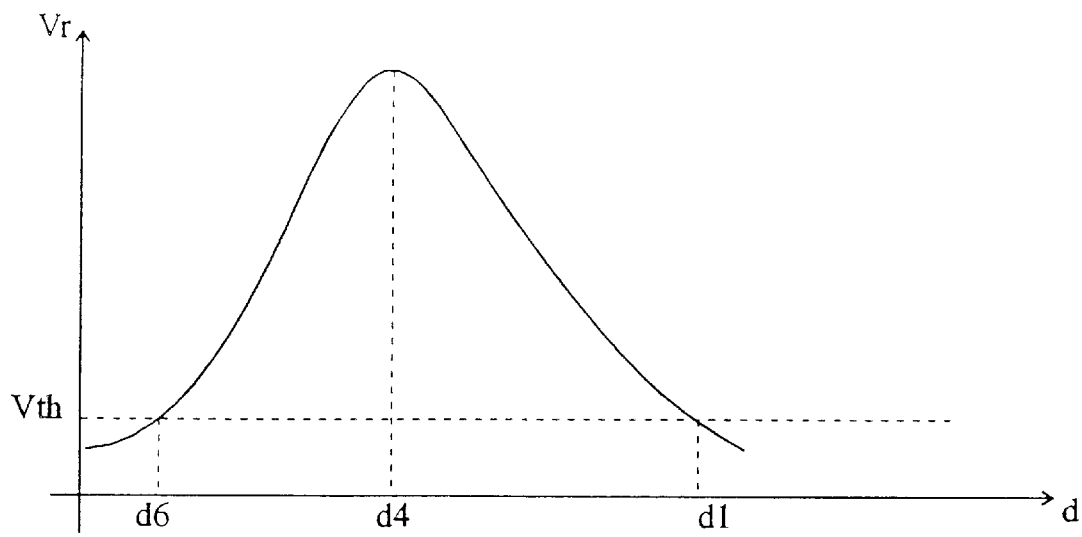
FIG. 3 illustrates the effect of the distance between two tuned oscillating circuits upon the voltage recovered in resistive modulation.
Figure 4:
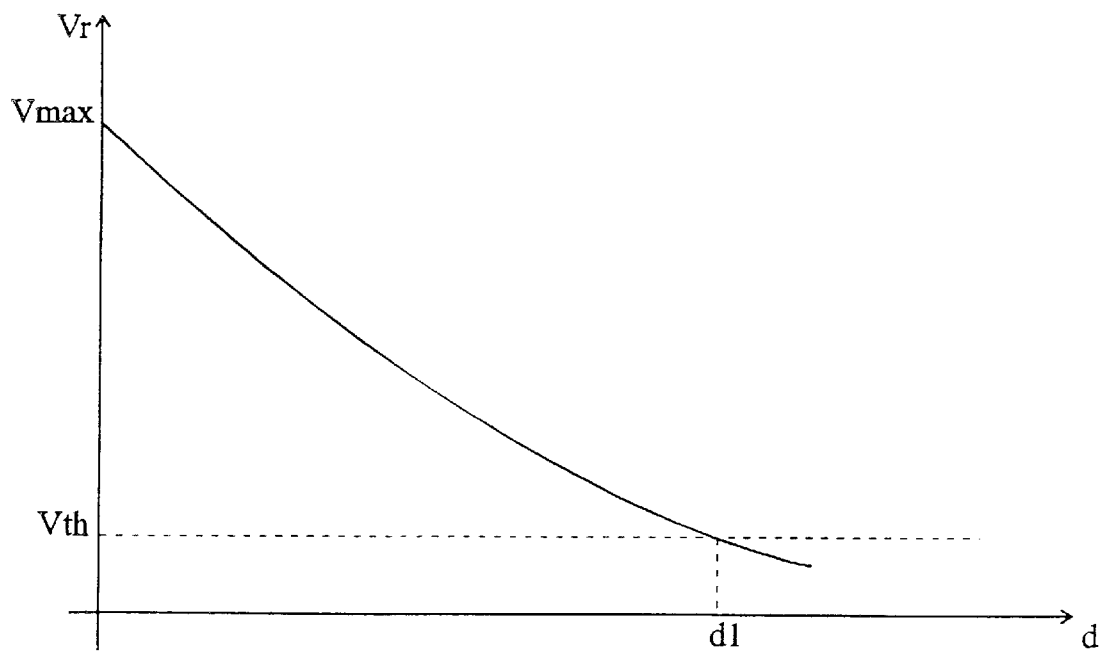
FIG. 4 illustrates the effect of the distance between two tuned oscillating circuits upon the voltage recovered in capacitive modulation.

FIGS. 3 and 4 illustrate, according to distance d (spacing between the transponder and the terminal), the amplitudes Vr of the signal recovered at output s (FIG. 1) on the terminal side after respectively resistive and capacitive back modulations, for a system in which the oscillating circuits are (in the absence of a modulation) tuned. FIG. 3 shows an example of a resistive back modulation characteristic. As illustrated in the drawing, the amplitude of the back modulation is approximately bell shaped, centered on an interval d4 corresponding to an optimal coupling (curve g4 in FIG. 2).

At large distances, the amplitude of the back modulation is under a threshold Vth of detection by the demodulator. This corresponds to range limit d1 of the system. At small distances (under d6), the amplitude is smaller than detection threshold Vth, where the voltage drop associated with the modulation superposes on a remote supply gap. FIG. 4 shows a similar example, but for a capacitive modulation. The shape of the amplitude-distance characteristic here has an approximately linear decrease from a maximum Vmax, to fall under detection threshold Vth when the distance reaches range limit d1 of the system. Thus, the remote supply gaps have no effect upon the capacitive back modulation.

However, a problem which is raised has to do with the practical implementation of such a modulation, which results in modifying the equivalent capacitance of the oscillating circuit. It should be noted that if, for a resistive modulation by decrease of the oscillating circuit charge, action can be taken downstream of the rectifying bridge. However, this is not possible in the case of an intervention on the very resonance frequency of the oscillating circuit. A first solution would consist of connecting a capacitor in series with a control switch between terminals 11 and 12, that is, in parallel with capacitor C2 of the oscillating circuit.

Such a solution cannot be applied in practice due to the need for switch control from block 17 supplied by rectified voltage Va. Indeed, no common reference potential is available between the oscillating circuit and voltage Va, so that it is presently impossible to control such a capacitor between terminals 11 and 12 by means of a simple MOS transistor controlled by block 17. Indeed, the electronic circuit of the transponder is supplied downstream of the rectifying bridge while the capacitor of the oscillating circuit is located upstream of this rectifying bridge.

Figure 5:
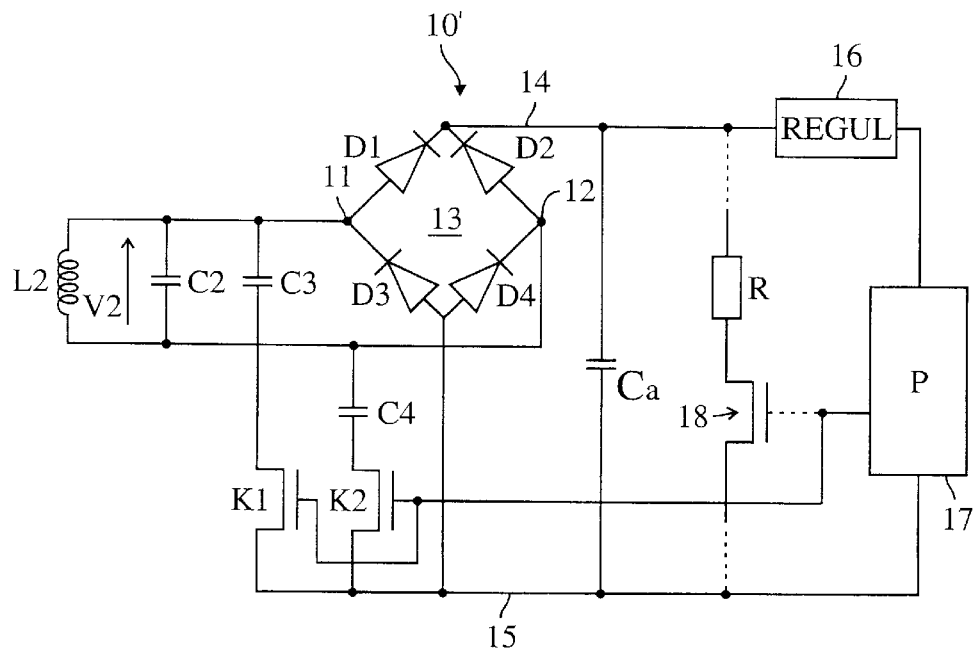
FIG. 5 shows a first embodiment of an electromagnetic transponder according to the present invention.

FIG. 5 shows a first embodiment of a transponder 10' according to the present invention. This transponder is formed from an oscillating circuit formed of an inductance L2 and a capacitor C2 connected in parallel between two AC input terminals 11 and 12 of a bridge 13. Two rectified output terminals 14 and 15 of bridge 13 provide, via a filtering capacitor Ca, a supply voltage to an electronic block 17 (for example, a processor P). The supply voltage of block 17 is provided by a regulator circuit 16. It should be noted that the regulation illustrated as being a series-type regulation may also be of parallel type using a regulator connected between terminals 14 and 15.

In the first embodiment of the present invention, two modulation capacitors C3 and C4 are each associated in series with a switch (for example, a MOS transistor) K1 and K2, respectively between terminals 11 and 12 and terminal 15. Thus, a first terminal of capacitor C3 is connected to terminal 11 and its other terminal is connected, via transistor K1, to terminal 15. A first terminal of capacitor C4 is connected to terminal 12 and its other terminal is connected, via a transistor K2, to terminal 15. Thus, to perform the modulation by means of transponder 10', two capacitors respectively associated with each sign of the AC voltage V2 are used.

The two capacitors C3 and C4 thus have the same value, adapted to perform the desired modulation. The two transistors K1 and K2 are controlled by block 17, preferably, with the same signal. As illustrated in FIG. 5, due to the multiplying of the modulation capacitors by two, a reference point is available (line 15) to control switches K1 and K2. Thus, if switches K1 and K2 are formed of N-channel MOS transistors, it is now possible, by a logic signal coming from block 17, to control these switches in all or nothing to ensure the necessary modulation to transmit data to the fixed read/write terminal.

A resistive back modulation circuit formed, as for a conventional transponder, of a resistor R associated with a switch 18 in series between terminals 14 and 15 may optionally be provided in a transponder 10' according to the present invention. In FIG. 5, the resistive modulation element has been illustrated in dotted lines to depict its optionality. In the case where a capacitive modulation system is combined with a resistive modulation system, it should be noted that the corresponding switches 18, K1, and K2 can be controlled by the same signal, the sources of the corresponding MOS transistors being all referenced to terminal 15. However, it will be preferable to forbid the resistive modulation when the transponder is in a remote supply gap. Thus, all the transistors can be controlled by the same signal which, for transistor 18, will simply transit through an enable means (more specifically, a disable means when the transponder is in a remote supply gap) that is not shown (for example, a simple logic gate).

Figure 6:
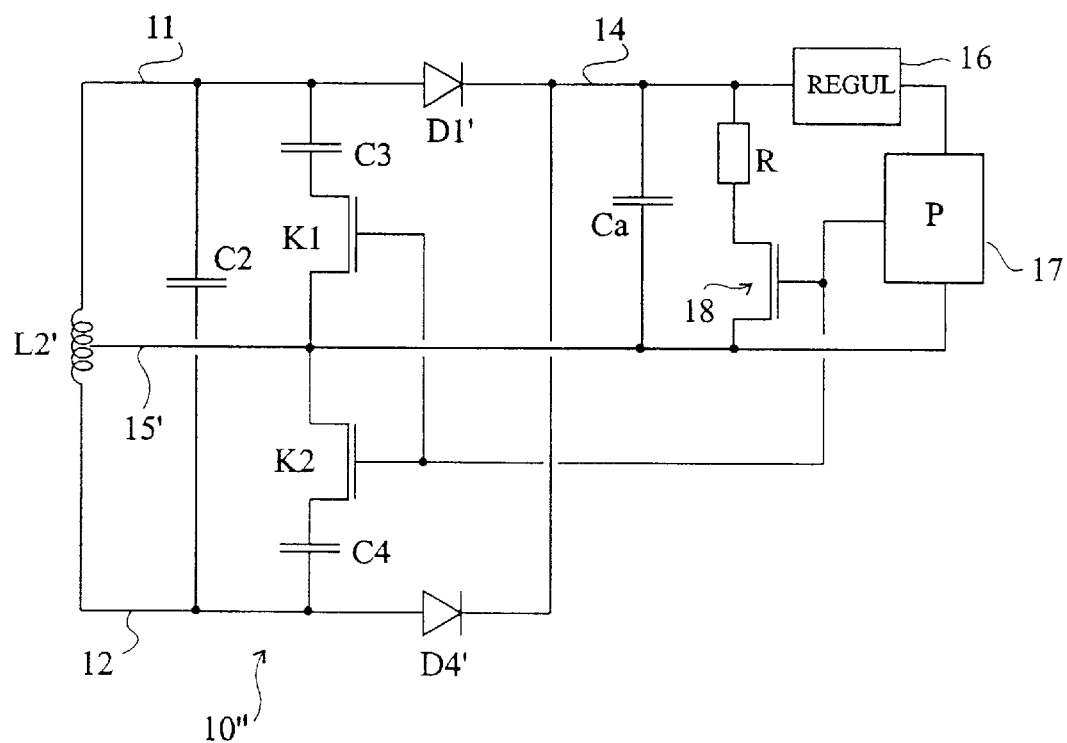
FIG. 6 shows a second embodiment of an electromagnetic transponder according to the present invention.

FIG. 6 shows a second embodiment of a transponder 10" according to the present invention. This transponder 10" includes many of the same elements as in FIG. 5. A feature of this second embodiment is to provide an inductance L2' with a midpoint 15'. This midpoint is then used as a reference line for the DC supply of the electronic circuit on the transponder side. Thus, a first terminal 11 of winding L2' is connected to the anode of a rectifying diode D1', the cathode of which forms supply terminal 14 of the circuit on the transponder side. A second terminal 12 of winding L2' is connected to the anode of a rectifying diode D4', the cathode of which is connected to terminal 14.

Capacitor C2 is connected between terminals 11 and 12. Similarly, the capacitive modulation stages are respectively connected between terminals 11 and 15' and between terminals 12 and 15'. Thus, a first capacitor C3, associated in series with a first switch K1, is connected between terminals 11 and 15', and a second capacitor C4, associated in series with a second switch K2, is connected between terminals 12 and 15'. The respective control terminals of switches K1 and K2 (for example, the respective gates of MOS transistors) are connected to an output terminal of electronic block 17 (for example, the transponder processor). A filtering capacitor Ca is connected between terminals 14 and 15' to filter the supply voltage of the electronic circuit and, in particular, supply regulator 16. In the example of FIG. 6, a resistive modulation stage formed of a resistor R associated in series with a switch 18 between terminals 14 and 15' has been shown. However, like in the embodiment of FIG. 5, this resistive modulation stage is optional.

An advantage of the second embodiment is that two diodes are sufficient to performed the rectification required to supply the transponder electronic circuit. However, this embodiment requires an inductance with a midpoint. The choice between the first and second embodiments will depend on the specific application and, in particular, on the frequency of use, which conditions the size of the necessary inductance.

According to a third embodiment (not shown) of the present invention, the modulation capacitors are the intrinsic capacitors of the MOS transistors forming switches K1 and K2. Thus, according to this embodiment, the drain/source capacitors of the MOS transistors are used, so that only two MOS transistors are necessary. Thus, the bulk of capacitors C3 and C4 of the first and second embodiments is saved. Such an embodiment is possible if the values of the capacitances necessary to the transponder back modulation are compatible with the intrinsic capacitances of the MOS transistors formed. It should be noted that the control signals will then have to be adapted, the stray capacitances being functionally present only when the transistors are off.

Thus, as an example of one specific embodiment, values on the order of one to several tens of picofarads may be chosen for capacitances C3 and C4 for a carrier frequency of 13.56 MHZ and for a modulation frequency of 847 kHz. Such capacitances are compatible with the usual values of the intrinsic capacitances of MOS transistors having an on-state drain-source resistance on the order of some hundred ohms.

The sizing of the capacitors, resistors, and inductive elements, as well as of the other components of the transponder according to the present invention, are adaptable by one of ordinary skill in the art according to the specific application. Moreover, although reference has been made in the foregoing description to a capacitive modulation on the transponder side, such modulation may be performed by a terminal if the terminal has to transmit information (for example, write information) to the transponder.

The present invention is particularly advantageous in electromagnetic transmission systems operating at high frequency. Indeed, at such frequencies, the speed at which transponders are moved by users is negligible as compared to the information transmission rate, so that the electromagnetic coupling is substantially unmodified during an information exchange. In general, the present invention applies to transponders that lack an independent power supply. In various embodiments, such a transponder can be a read-only transponder (i.e., for operating with a terminal which only reads the transponder data) or a read/write transponder (i.e., in which the data contained therein can be modified by the terminal).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A system of electromagnetic transmission including at least one transponder and a terminal that generates an electromagnetic field for communicating with the transponder when the transponder is in the electromagnetic field, said transponder comprising:

an oscillating circuit including an inductive element having two end terminals;

an electronic circuit for transmitting digitally-coded information to the terminal;

a rectifying circuit coupled to the oscillating circuit to provide a DC supply voltage to the electronic circuit; and a capacitive modulation circuit coupled to both of the end terminals of the inductive element and to the reference potential of the electronic circuit.

2. The system of claim 1, wherein the capacitive modulation circuit includes two capacitors, one of the capacitors being coupled between one of the end terminals of the inductive element and the reference potential of the electronic circuit and the other of the capacitors being coupled between the other of the end terminals of the inductive element and the reference potential of the electronic circuit.

3. The system of claim 1, wherein the capacitive modulation circuit includes two MOS transistors, one of the transistors being coupled between one of the end terminals of the inductive element and the reference potential of the electronic circuit and the other of the transistors being coupled between the other of the end terminals of the inductive element and the reference potential of the electronic circuit.

4. The system of claim 3, wherein the gate of each of the transistors receives a modulation signal transmitted by the electronic circuit.

5. The system of claim 3
wherein the capacitive modulation circuit includes two capacitors, and
each of the transistors is associated in series with one of the capacitors such that each transistor acts as a switch to control the associated capacitor.

6. The system of claim 1, wherein the inductive element of the oscillating circuit includes a midpoint that provides the reference potential of the electronic circuit.

7. The system of claim 1, wherein said transponder further comprises a resistive modulation circuit coupled in parallel with a capacitor to filter the DC supply voltage provided by the rectifying circuit.

8. The system of claim 7, wherein one signal controls both the capacitive modulation circuit and the resistive modulation circuit.

9. The system of claim 7, wherein the resistive modulation circuit is controlled by a circuit for enabling a control signal for the capacitive modulation circuit.

10. An electromagnetic transponder comprising:

an oscillating circuit including an inductive element having two end terminals;

an electronic circuit including a transmission circuit for transmitting digitally-coded information;

a rectifying circuit coupled to the oscillating circuit to provide a DC supply voltage to the electronic circuit; and a capacitive modulation circuit coupled to both of the end terminals of the inductive element and to the reference potential of the electronic circuit.

11. The transponder of claim 10, wherein the capacitive modulation circuit includes two capacitors, one of the capacitors being coupled between one of the end terminals of the inductive element and the reference potential of the electronic circuit and the other of the capacitors being coupled between the other of the end terminals of the inductive element and the reference potential of the electronic circuit.

12. The transponder of claim 10, wherein the capacitive modulation circuit includes two MOS transistors, one of the transistors being coupled between one of the end terminals of the inductive element and the reference potential of the electronic circuit and the other of the transistors being coupled between the other of the end terminals of the inductive element and the reference potential of the electronic circuit.

13. The transponder of claim 12, wherein the gate of each of the transistors receives a modulation signal transmitted by the electronic circuit.

14. The transponder of claim 12,
wherein the capacitive modulation circuit includes two capacitors, and
each of the transistors is associated in series with one of the capacitors such that each transistor acts as a switch to control the associated capacitor.

15. The transponder of claim 10, wherein the inductive element of the oscillating circuit includes a midpoint that provides the reference potential of the electronic circuit.

16. The transponder of claim 10, further comprising a resistive modulation circuit coupled in parallel with a capacitor to filter the DC supply voltage provided by the rectifying circuit.

17. The transponder of claim 16, wherein one signal controls both the capacitive modulation circuit and the resistive modulation circuit.

18. The transponder of claim 16, wherein the resistive modulation circuit is controlled by a circuit for enabling a control signal for the capacitive modulation circuit.

* * * * *